United States Patent [19]
Oosterbaan et al.

[11] 4,264,781
[45] Apr. 28, 1981

[54] APPARATUS FOR ENCODING AND DECODING DATA SIGNALS

[75] Inventors: DuWayne D. Oosterbaan, Escondido; Gerard J. Williams, Valley Center, both of Calif.

[73] Assignee: NCR Corporation, Dayton, Ohio

[21] Appl. No.: 30,252

[22] Filed: Apr. 16, 1979

[51] Int. Cl.³ .............................................. H04L 9/02
[52] U.S. Cl. ....................................... 178/22; 331/78; 364/717
[58] Field of Search .............. 178/22; 375/2; 364/717; 331/78

[56] References Cited

U.S. PATENT DOCUMENTS

| | | | |
|---|---|---|---|
| 3,614,316 | 10/1971 | Andrews, Jr. ........................... | 178/22 |
| 3,657,699 | 4/1972 | Rocher ..................................... | 178/22 |
| 3,728,529 | 4/1973 | Kartchner et al. ...................... | 178/22 |
| 3,784,743 | 1/1974 | Schroeder ................................ | 178/22 |
| 3,796,830 | 3/1974 | Smith ....................................... | 178/22 |
| 3,911,216 | 10/1975 | Bartek et al. ............................ | 178/22 |
| 3,988,538 | 10/1976 | Patten ..................................... | 178/22 |
| 4,202,051 | 5/1980 | Davida et al. ........................... | 375/2 |

*Primary Examiner*—Howard A. Birmiel
*Attorney, Agent, or Firm*—J. T. Cavender; Stephen F. Jewett; Edward Dugas

[57] ABSTRACT

An encoder/decoder is provided having two random bit generators which are cross-coupled in the Encoding mode with the data signal being directed to the input of each random bit generator. The data signal is also logically combined with the output of each random bit generator. In the Decoding mode the random bit generators are connected in a feedback configuration and the to-be-decoded signal is directed to the input of each random bit generator. The to-be-decoded signal is also logically combined with the output of each random bit generator to provide the decoded signal.

6 Claims, 1 Drawing Figure

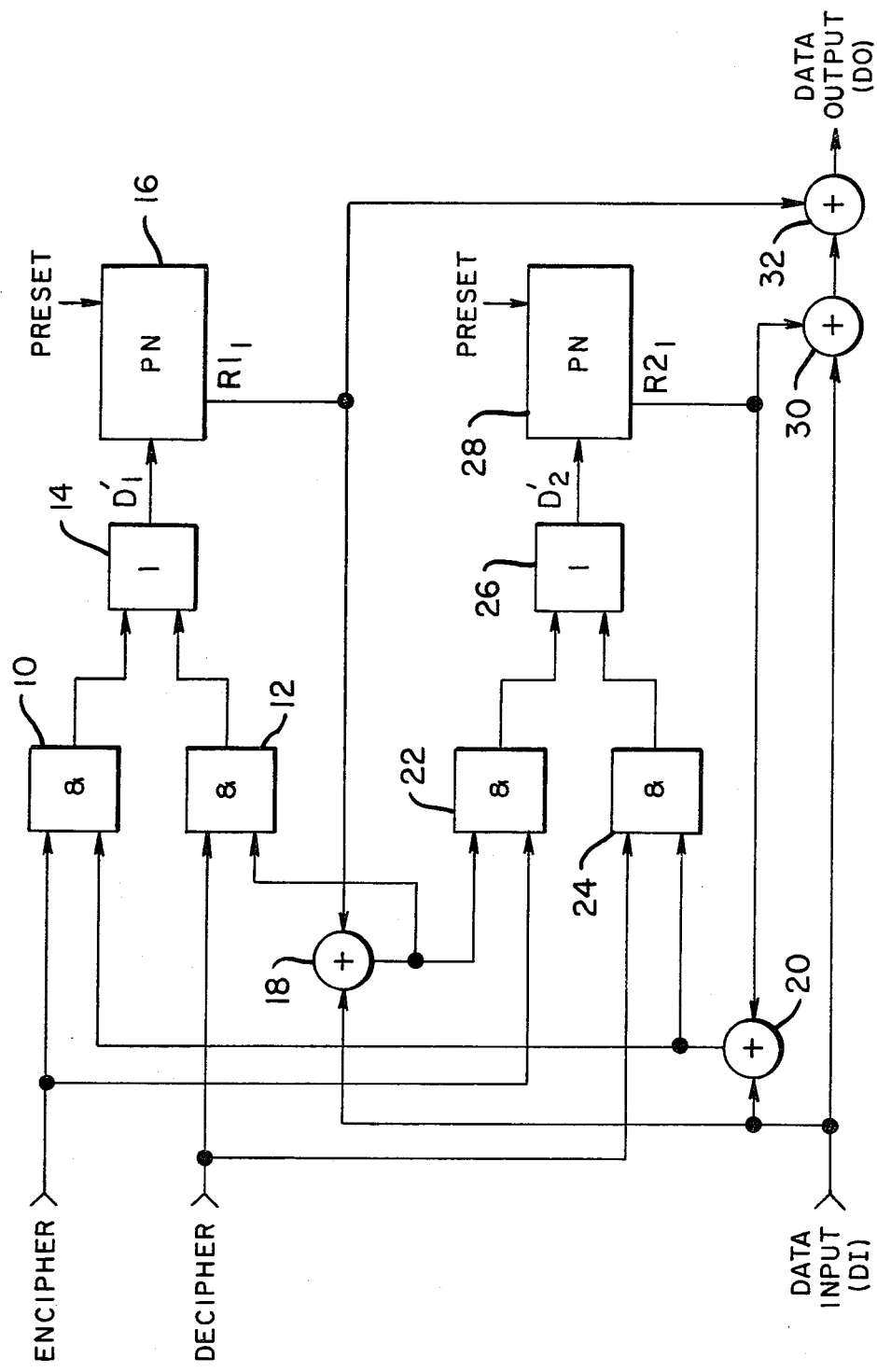

APPARATUS FOR ENCODING AND DECODING DATA SIGNALS

BACKGROUND OF THE INVENTION

Data communication over unsecured communication links such as telephone lines is subject to detection and modification with a possible end result being the loss of a preferred position. In order to minimize or to totally eliminate the possibility of a compromise of the transmitted data message, various forms of encoding the message have been devised. The following is a list of those encrypter related patents known to applicants at the time of filing the present application:

U.S. Pat. Nos.

3,522,374, 3,614,316, 3,657,699, 3,731,197, 3,773,977, 3,781,473, 3,784,743, 3,798,359, 3,798,360, 3,808,365, 3,824,467, 3,911,216, 4,074,066, 4,078,152 and 4,004,089.

The following publications are deemed to be of interest for their showing of the state of the art, at the time of filing the present Application: "The Outlook For Computer Security" by Whitfield Diffie published in Mini-Microsystems, pages 42–44, October 1978, and "Putting Data Encryption To Work" by Carl H. Meyer and Walter L. Tuchman, published in Mini-Microsystems, pages 46–52. Each of the inventors of above cited patents and the authors of the aforementioned publications have appreciated the problem that occurs with the transmission of unencrypted data, namely, unauthorized access to the communicated data; and has attempted to solve the problem by encoding the to-be-transmitted data. Once the data is encoded, it is still not necessarily secure from unauthorized access. If the code used in the encoding process is relatively simplistic, it is just a matter of trial and error before the code is broken and unauthorized access is gained. In order to be secure from decoding attempts, which attempts now take advantage of the high power available in large-scale computers, it is necessary to make, for example, the trial and error process extremely long and complicated which in turn makes the attempt financially unsound. It is of course the ultimate goal of an encryption system to encode the to-be-transmitted data in such a manner that deciphering by unauthorized means is impossible even with an unlimited budget of time and computing power. Applicants have directed their attention to the solution of this problem which attention and effort has resulted in the to-be-described encoder/decoder apparatus.

SUMMARY OF THE INVENTION

The encoder/decoder apparatus utilizes a logic means for operatively connecting a pair of PN (pseudorandom) bit generators in a cross-coupling configuration for an encoding mode of operation and in a feedback configuration for a decoding mode of operation. A clear text data signal is combined, by the logic means, with the signals at the inputs of each of the cross-coupled configured PN generators when in the encoding mode. The output of one PN generator is logically combined with the clear text data signal to provide a partially encoded data signal, then the output of the second PN generator is logically combined with the partially encoded data signal to provide the totally encoded data output signal. In the deciphering mode, each of the PN generators is connected in a feed-back mode and the encoded data signal is logically provided to the inputs of each of the PN generators. The encoded data signal is then logically combined with the signals from each of the outputs of the PN generators to provide the decoded data signal. Through the use of cross-coupled PN generators, each implemented to satisfy a polynomial, preferably a primitive polynomial, an improved encryption action is realized.

The following two polynomials are examples of primitive polynomials which may be used:

$$X^{16}+X^{12}+X^{11}+X^9+X^8+X^4+X^3+X^2+1;$$

$$X^{16}+X^{12}+X^3+X+1.$$

Cross-coupling causes the clear text data signal to be encoded first by one function, which is comprised of the interaction of two generator-type polynomials and the clear text data signal and then by a second function which is again an interaction of the two generator polynomials and the clear text data signal. Due to the fact that the clear text data signal is also logically combined with the cross-coupled signal from the PN generators, the next state of the output signal from the PN generators is partially determined by the current input bit of the clear text data signal.

To further encipher the clear text data signal, an initializing key comprised of; a series of arbitrarily-chosen bits having an arbitrarily-chosen length is directed to the cross-coupled PN generators in the enciphering mode prior to receipt of the clear text data signal. The PN generators respond to the bit sequence of the key by setting to an initializing state. The initialized state of the PN generators is also established prior to the receipt of an encoded signal in order to insure accurate decoding.

More specifically in the preferred embodiment of the invention there is provided a first and second shift register for generating random bit signals each having an input, an output and a preset input for receiving a preset signal to set the registers to a preset condition.

A first pair of summing means is provided, with each summing means having an input operatively connected to an output of a respective shift register and an input operatively connected to a source of data signals for summing the signals present on their respective inputs and for providing summed output signals.

Further provided is a second pair of summing means, with each summing means having an input operatively connected to an output of a respective shift register. One of the summing means of the second pair has an input operatively connected to the source of data signals and the other of the summing means of the second pair has an input operatively connected to the output of the other of the pair of summing means. The output of the other of the second pair of summing means functions as the apparatus output. There is also provided, a means for connecting the summed output signals from the first pair of summing means to the input of respective shift registers in response to a first command signal and for connecting the summed output signals from the first pair of summing means to the input of non-respective shift register in response to a second command signal.

From the foregoing it can be seen that it is a primary object of the present invention to provide an improved encoder/decoder.

It is another object of the present invention to provide an encrypting apparatus which will encipher a string of data independent of the length of the string.

It is another object of the present invention to provide an encrypting apparatus wherein the key is destroyed after the data has been enciphered.

It is yet a further object of the present invention to provide an encryption apparatus wherein the next state of the apparatus is partially determined by the state of input data bits.

It is another object of the present invention to provide an encryption apparatus wherein the key may be any arbitrarily chosen bit stream.

A further object of the present invention is to provide an encryption apparatus wherein the key may be any arbitrarily chosen length.

It is yet a further object of the present invention to provide an encryption apparatus wherein successive levels of encryption may be accomplished by cascading like apparatus.

These and other objects of the present invention will become more apparent when taken in conjunction with the following description and drawing, wherein like characters indicate like parts and which drawing forms a part of the present specification.

BRIEF DESCRIPTION OF THE DRAWING

FIG. 1 is a logic schematic diagram of the preferred embodiment of the present invention.

DESCRIPTION OF THE PREFERRED EMBODIMENT

Referring to the encoder/decoder apparatus of FIG. 1, an ENCIPHER terminal, so labeled, is operatively connected to the gating input of AND gate 10 and of AND gate 22. A DECIPHER terminal, so labeled, is operatively connected to the gating input of AND gate 12 and of AND gate 24. A data input terminal, so labeled, is operatively connected by means of a summing junction 18 to the gated input of AND gate 12 and of AND gate 22 and by means of the summing junction 20 to the gated input of AND gate 24 and of AND gate 10. The outputs of AND gates 10 and 12 are connected to the inputs of an OR gate 14. The output of OR gate 14 is denoted as D'1, signalwise, and is coupled to the input of a pseudo-random bit sequence generator, PN generator 16. The outputs of AND gates 22 and 24 are operatively connected to the input of OR gate 26. The output of OR gate 26 is denoted as D'2, signalwise, and is coupled to the input of a PN generator 28. The output of PN generator 16, denoted $R1_1$, is directed to an input of the summing junction 18 and to an input to a summing junction 32. The output of the PN generator 28 denoted $R2_1$ is directed to a summing input of the summing junction 20 and to a summing input of a summing junction 30. The summed output from summing junction 30 is directed to a summing input of the summing junction 32. The output of the summing junction 32 is the apparatus output, denoted D0. The data input terminal labeled DI is operatively connected to a summing input of summing junctions 18, 20 and 30. In the preferred embodiment of the invention, the PN generators 16 and 28 are each 16-bit shift registers which are connected in the well-known feedback method to implement the following primitive polynomials:

(Gen. 16)
$$X^{16}+X^{12}+X^{11}+X^9+X^8+X^4+X^3+X^2+1$$

(Gen. 28) $X^{16}+X^{12}+X^3+X+1$

The above polynomials receive more detailed attention in the publication entitled: "Error-Correcting Codes" by Peterson, MIT Press, copyright 1961, page 261. The summing junctions 18, 20, 30 and 32 may be EXCLUSIVE-OR gates which perform binary addition.

In operation, the PN generators 16 and 28 are initialized to a predetermined state by the application of a preset signal to the preset input. An ENCIPHER mode select signal, for example a binary 1 level signal, is applied to the ENCIPHER terminal and a signal of opposite level, i.e., a binary 0 is applied to the DECIPHER terminal. The binary 1 level signal on the inputs of AND gates 10 and 22 enable these gates. The binary 0 level signal on the inputs of AND gates 12 and 24 disables these gates.

A random sequence of bit signals, of arbitrary length, referred to as a key bit stream, is applied to the data input terminal. The data bits of the key bit stream are summed on a bit-by-bit basis with the output bits from a respective PN generator, by the summing junctions 18 and 20, respectively. Identifying the signal on the data input terminal as DI, and the signal on the data output terminal as D0 the following equations set forth the logic state of the signals into the PN generator 16 and 28 and the signals present at the encoder/decoder output:

| ENCIPHER MODE | DECIPHER MODE |
|---|---|
| 1. $D0 = DI \oplus R1_1 \oplus R2_1$ | 1. $D0 = DI \oplus R1_1 \oplus R2_1$ |
| 2. $D_1' = DI \oplus R2_1$ | 2. $D_1' = DI \oplus R1_1$ |
| 3. $D_2' = DI \oplus R1_1$ | 3. $D_2' = DI \oplus R2_1$ |

In the ENCIPHER mode the output bits from the PN generator 16 are summed with the clear text data signal in the summing junction 18 and are directed to the input of the PN generator 28 via AND gate 22 and OR gate 26.

In a like manner, the output bits from the PN generator 28 are summed with the clear text data signal in the summing junction 20 and directed to the input of the PN generator 16 via AND gate 10 and OR gate 14.

The summing junction 30, in the ENCIPHER mode, combines the clear text bit stream with the pseudo-random bit sequence from PN generator 28, on a bit-by-bit basis to provide a partially encoded bit sequence. Summing junction 32 combines the partially encoded bit sequence with the pseudo-random bit sequence from PN generator 16, on a bit-by-bit basis to provide the completed enciphered signal, D0, to the data output terminal.

To convert from the ENCIPHER mode to the DECIPHER mode it is first necessary to initialize the PN generators 16 and 28. This is accomplished by applying a preset signal to their PRESET inputs. During initialization an enabling signal is applied to the ENCIPHER input and a disabling signal is applied to the DECIPHER input. The key bit sequence is applied to the data input terminal to drive the PN generators, 16 and 28, to their predetermined states.

To decipher an enciphered signal an enabling signal, logic level 1, is applied to the DECIPHER labeled input terminal, for effecting the enablement of gates 12 and 24. A disabling signal, logic level 0, is applied to the ENCIPHER labeled input terminal for effecting the disablement of gates 10 and 22.

With gates 10 and 22 disabled the cross-coupling connections of PN generators 16 and 18 are terminated.

The enabling of gates 12 and 24 effectively connects the output of each PN generator to its respective input in the standard feedback configuration.

The signal to be deciphered is applied to the data input terminal. The inputs to summing junctions 18, 20 and 30 each receive the to-be-deciphered signal. The to-be-deciphered signal is combined with the output bit present at the output of PN generators 16 and 28 and the combined signal is directed to the input of the respective PN generators. The signal at the input of the PN generator determines the next state of the PN generator output signal.

The to-be-decoded signal is combined on a bit-by-bit basis first with the output of PN generator 28, in summing junction 30, and then with the output of PN generator 16. This combining results in a decoding of the enciphered signal to provide at the data output terminal the clear text data signal.

Further encoding may be accomplished by cascading one or more of the encoder/decoders of the present invention by connecting the data output terminal of the first encoder/decoder to the data input of the second encoder/decoder.

The same or a different key bit sequence could be utilized to initialize the PN generators of the first and the second encoder/decoder.

While there has been shown what is considered to be the preferred embodiment of the invention it will be manifest that many changes and modifications may be made therein without departing from the essential spirit of the invention. It is intended, therefore, in the annexed claims, to cover all such changes and modifications that may fall within the true scope of the invention.

We claim:

1. An encoder/decoder apparatus comprising:
   at least a pair of random bit generators, each having an input and an output;
   logic means for operatively cross-coupling the outputs and inputs of said random bit generators for an encoding mode of operation and for operatively connecting the output of each generator to its respective input for a decoding mode of operation;
   at least a first pair of summing means each summing means having an input connected to the output of a respective random bit generator, and an input for receiving a data signal for summing said data signal with the output signal from respective random bit generators, the output of each summing means operatively connected to said logic means; and
   at least a second pair of summing means each summing means having an input connected to the output of a respective random bit generator, one of the summing means of said second pair of summing means having an input for receiving said data signal, the other summing means of said second pair of summing means having an input connected to the output of the one summing means, with the output from the other summing means being the encoder/decoder apparatus output.

2. The encoder/decoder apparatus according to claim 1 wherein said first and said second pair of summing means are EXCLUSIVE-OR GATES.

3. The encoder/decoder apparatus according to claim 1 wherein said logic means is comprised of:
   first gating means responsive to an encoding mode signal for connecting the output of each of the summing means of said first pair of summing means to the input of a non-respective random bit generator;
   second gating means responsive to a decoding mode signal for connecting the output of each of the summing means of said first pair of summing means to the input of a respective random bit generator.

4. The encoder/decoder apparatus according to claim 3 wherein said first and said second gating means are AND gates and further including first and second OR gates connected between the outputs of said AND gates and the input to respective random bit generators.

5. An encoder/decoder apparatus comprising:
   first and second shift registers for generating random bit signals each having an input, an output and a preset input for receiving a preset signal to set said registers to a preset condition;
   a first pair of summing means each summing means having an input operatively connected to an output of a respective shift register and an input operatively connected to a source of data signals for summing the signals present on their respective inputs and for providing summed output signals;
   a second pair of summing means each summing means having an input operatively connected to an output of a respective shift register and one of the summing means of said second pair of summing means having an input operatively connected to the source of data signals and the other of the summing means of said second pair of summing means having an input operatively connected to the output of the other of said pair of summing means, the output of the other of said second pair of summing means being the apparatus output; and
   means for connecting the summed output signal from said first pair of summing means to the input of respective shift registers in response to a first command signal and for connecting the summed output signal from said first pair of summing means to the input of non-respective shift register in response to a second command signal.

6. The encoder/decoder apparatus according to claim 5 wherein said first and second pair of summing means are EXCLUSIVE-OR GATES.

* * * * *